J. I. PEASE.
Car Seat.
No. 106,615.
Patented Aug. 23, 1870.
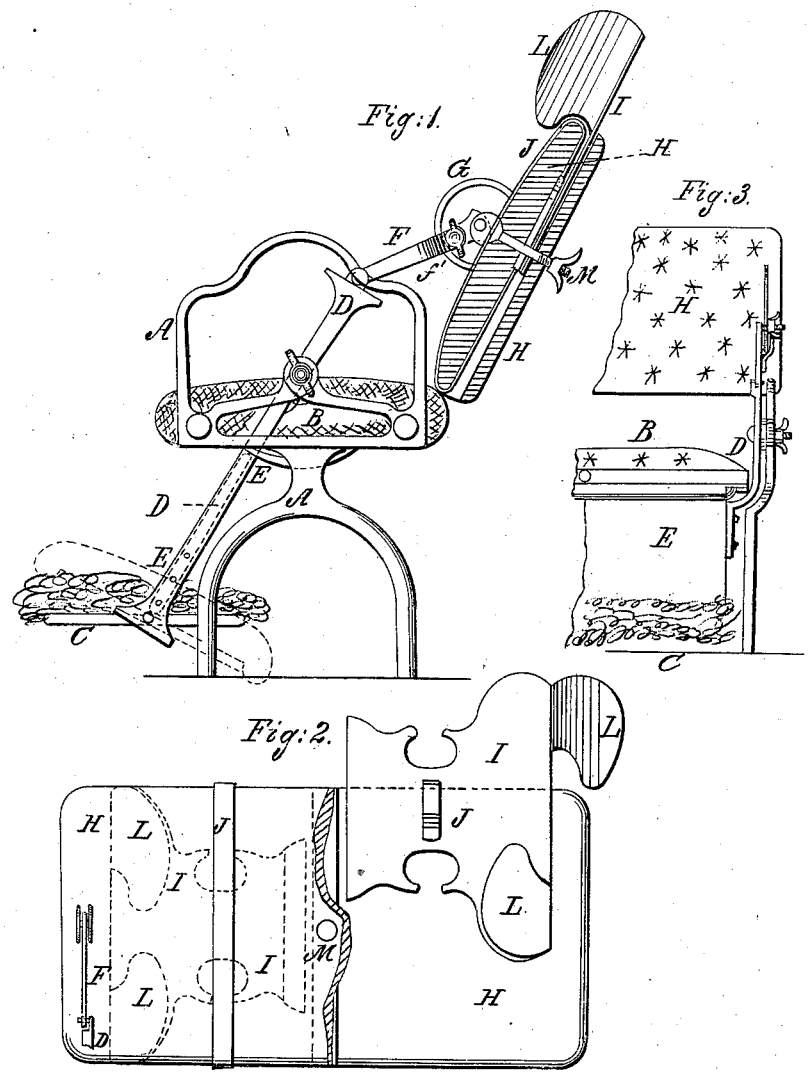

United States Patent Office.

JOSEPH IVES PEASE, OF STOCKBRIDGE, MASSACHUSETTS.

Letters Patent No. 106,615, dated August 23, 1870.

IMPROVEMENT IN RAILWAY CAR-SEATS.

The Schedule referred to in these Letters Patent and making part of the same.

*To all whom it may concern:*

Be it known that I, JOSEPH IVES PEASE, of Stockbridge, in the county of Berkshire and State of Massachusetts, have invented a new and useful Improvement in Adjustable Railroad Car-Seats; and I do hereby declare that the following is a full, clear, and exact description thereof, which will enable others skilled in the art to make and use the same, reference being had to the accompanying drawing forming part of this specification.

Figure 1 is an end view of my improved car-seat, partly in section through the back.

Figure 2 is a front view of the seat-back, part being broken away to show the construction.

Figure 3 is a front view of the partition, as it works over the convex bottom of chair, to exclude a draught of air.

Similar letters of reference indicate corresponding parts.

My invention has for its object to furnish an improved seat for railroad cars, which shall be so constructed that its back and head and foot-rests may be swung or inclined into such a position that the passenger may recline or sleep comfortably upon it; and It consists in the construction and combination of the various parts of the seat, as hereinafter more fully described.

A represents the end frames of the seat, to which the bottom B is secured.

C is the movable foot-rest, the centers of the ends of which are pivoted to the lower ends of the arms or levers D.

The space between the arms D, foot-rests C, and bottom B of the seat, is filled up with a close partition or diaphragm, E, as shown in fig. 1, to prevent draughts or currents of air from passing beneath the seat.

This requires the lower side of the bottom B to be made convex, as shown in fig. 1, so that the upper edge of the partition E may be in contact with the bottom of the seat, however it may be adjusted.

The upper part of the arms or levers D pass through a space between the end frames A and the middle parts of the ends of the seat-bottom B, and are pivoted to the said frames a little above the upper surface of the said seat-bottom B, as shown in fig. 1.

To the upper ends of the arms or levers D are pivoted the lower ends of the bars F, the upper ends of which are pivoted to ears attached to the seat-back H, so that the seat H may be set at any desired inclination which the ease of the passenger may require.

G are curved arms attached to the end parts of the seat-back H, and around which passes a flange or arm, *f*, attached to or formed upon the bar F, and which is provided with a clamping-bolt and nut, so that the said bar, when adjusted, may be securely clamped to the arm G.

The bolts by which the arms or levers D are pivoted to the end frames A, and the bolts by which the bars F are connected with the arms G, are provided with hand-nuts, so that, when the seat-back and foot-rest have been adjusted in their proper positions, they may be secured in such positions by turning the nuts. Or, if desired, the said nuts may be made to be turned with a key, so as to give the conductor or attendant control of the seats.

The backs H of the seats are made double, or hollow, as shown in figs. 1 and 2, to receive the head-rests I, said parts being kept at the proper distance apart by cross-cleats at the ends and center, as shown in dotted lines in fig. 2.

I are the head-rests, which are placed in the recesses or hollows of the seat-back H, and have straps J attached to them, passing around the outer side of the seat-back H, so that the head-rests I may be conveniently drawn out and in, as may be required.

Both ends of the head-rests I are made exactly alike, so that they may be drawn out of that edge of the seat-back that may happen to be upward.

The ends of the head-rests I are so formed as to conveniently and comfortably support the head, and are provided with wings L, which, when the head-rests are pushed in, are folded down upon the body of said head-rest, as shown in fig. 2, and which, when the head-rests are drawn out, are opened out, and are held at an angle by their notched lower edges resting upon the upper edge of the seat-back, as shown in figs. 1 and 2, or in some other suitable manner.

The head-rests I I, when adjusted in position, may be secured in place by tightening up the hand-nut upon the bolt M, which passes through the seat-back, so as to clamp the said head-rests between the parts of the said seat-back.

The nut of the bolt M may also be made to be operated by a key, so as to bring the head-rests also under the control of the conductor or attendant.

Having thus described my invention,

I claim as new and desire to secure by Letters Patent—

1. The foot-rest C, close partition E, vibrating side arms D, and convex-bottomed seat B, all constructed, arranged, and operating together, as set forth.

2. The winged head-rests I L, combined with the hollow back H, as and for the purpose specified.

3. The vibrating arms D, pivoted between the seat and frame in a vertical plane running transversely through the middle of the seat, and to an upwardly-projecting bracket of the frames, as shown and described.

4. The circular guide-bar G, attached to the seat-back, and the rods F, having spring side-arms and adjusting-screws, combined with the arms D D, as and for the purpose specified.

Witnesses:        JOSEPH IVES PEASE.
JAMES T. GRAHAM,
GEO. W. MABEE.